(12) United States Patent
Rangarajan et al.

(10) Patent No.: US 6,583,716 B2
(45) Date of Patent: Jun. 24, 2003

(54) SYSTEM AND METHOD FOR PROVIDING LOCATION-RELEVANT SERVICES USING STORED LOCATION INFORMATION

(75) Inventors: Jayanthi Rangarajan, Naperville, IL (US); Steve Gulati, Vernon Hills, IL (US); Senaka Balasuriya, Westmont, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/930,357

(22) Filed: Aug. 15, 2001

(65) Prior Publication Data

US 2003/0034879 A1 Feb. 20, 2003

(51) Int. Cl.[7] .............................. G08B 5/22; G05B 19/00
(52) U.S. Cl. ...................... 340/7.56; 340/5.8; 340/5.86; 340/7.29; 340/995; 701/208; 707/104.1
(58) Field of Search ................................ 340/7.52, 7.29, 340/7.56, 990, 995, 5.8, 5.86; 707/10, 104.1; 701/208, 209, 200, 210

(56) References Cited

U.S. PATENT DOCUMENTS 5,543,789 A  * 8/1996 Behr et al. .................. 340/995
5,682,525 A  * 10/1997 Bouve et al. ............... 340/995
6,047,280 A  * 4/2000 Ashby et al. .................. 707/2

* cited by examiner

Primary Examiner—Donnie L. Crosland
(74) Attorney, Agent, or Firm—Randall S. Vaas; Hisashi D. Watanabe

(57) ABSTRACT

A method for storing geographic information at a communication node is provided. Geographic data is received and an authentication request to a geographic authentication database in communication with the communication node is transmitted. An authentication response is then received and the geographic data is stored in a storage database in communication with the communication node. Systems and programs for storing geographic information are also provided.

20 Claims, 5 Drawing Sheets

SYSTEM AND METHOD FOR PROVIDING LOCATION-RELEVANT SERVICES USING STORED LOCATION INFORMATION

FIELD OF THE INVENTION

The present invention relates generally to communication systems, and more particularly to a method and system for receiving geographical information about a location and authenticating the geographical information.

BACKGROUND OF THE INVENTION

Wireless devices may now include the ability to access content and applications from content servers such as Internet web servers and other such information sources. In recent years, a number of service systems have been implemented or proposed to provide additional services to wireless devices based on locations relevant to the devices. For example, such a service could locate the nearest Automated Teller Machine (ATM), gas station, bank, police station or restaurant in relation to the relevant location.

Typically, the location relevant to the service is the location of the communication device. However, because a user is able to access a wireless device from any location, the location relevant to the service may not be the same as the device's current location. For example, a user traveling from Midway Airport in Chicago may desire to know the locations of ATMs near his destination, rather than near Midway. Additionally, a typical user is likely to use the wireless device from one or more of the same locations over and over again. For example, the user may want information relevant to Midway Airport on the outgoing part of his trip, information relevant to his destination on a second part of his trip and then information relevant to Midway again at the end of his trip.

Currently, a user would have to input the location of Midway to find ATMs at Midway. Then to find ATMs at his destination, the user would have to input his destination. Then to find restaurants at Midway, he would have to re-enter the Midway location.

A method for providing location-relevant services based on a previously stored location that overcomes the disadvantages would be desirable.

DETAILED DESCRIPTION OF THE PRESENTLY PREFERRED EMBODIMENTS

Geographic information is stored in a highly reliable manner. Upon receiving geographic data, an authentication request is transmitted. An authentication response regarding the geographic data is received, and the geographic data is stored in a storage database. Geographic data is thus stored after it is authenticated and thus is determined to be accurate, or reliable, information.

Figure 1:
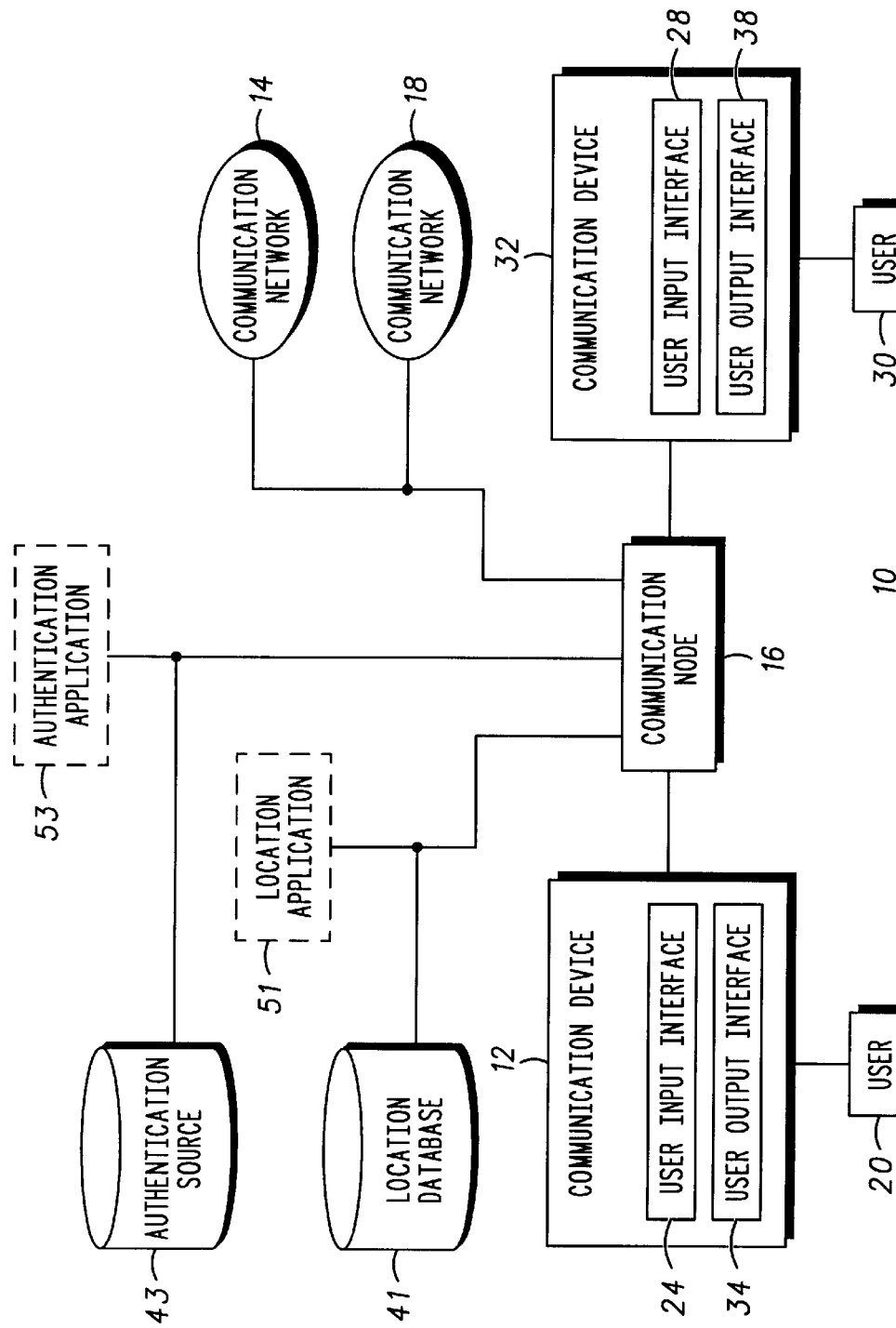
FIG. 1 is a block diagram illustrating a communication system.

FIG. 1 shows one embodiment of a communication system 10. The communication system 10 generally includes one or more network access devices or communication devices 12, 32, communication networks 14, 18 and a communication node 16. The communication system 10 also includes a location database 41 in communication with the node 16. The communication system 10 also includes at least one authentication source 43 in communication with the node 16. One embodiment of the communication system of the present invention may include a location application 51 in communication with the node 16, with location database 41, with authentication source 43 or with authentication application 53. Another embodiment of the communication system 10 of the present invention may include an authentication application 53 in communication with the node 16, with location application 51, with authentication source 43 or with location database 41.

As further described below, the communication system 10 may provide various services and capabilities to cellular users, wire-line telephone users, paging users, satellite users, mobile or portable telephone users, trunked users, computer network users (e.g., Internet or Intranet users), wireless data users, branch office users, cable users and the like. Communication system 10 may also accurately locate communication device 12, 32 and/or its associated user 20, 30 in order to provide location-relevant services to the user 20, 30 via device 12, 32. Communication system 10 may also accurately locate any relevant location in order to provide services to the user 20, 30 via device 12, 32.

Communication system 10 or any of its components may be operated by any entity, including, without limitation, a government agency, a commercial entity, or any other appropriate entity.

In one embodiment of the invention, communication system 10 also includes a location application 51. Location application 51 may include one or more programs or other applications for processing location information. Location application 51 may comprise computer readable/processable program code. Such location information may be information input by user 20, 30 via device 12, 32. Location application 51 may also process information to be sent to or stored in location database 41. Alternatively, location information processed by location application 51 may be information provided by communication node 16 or forwarded by communication node 16 from communication networks 14, 18. Location information processed by location application 51 may also be provided by information sources such as location database 41 or authentication source 43. Location application 51 may interact with user 20, 30 via device 12, 32. In one embodiment of the invention, location application 51 resides on communication node 16. In another embodiment, location application 51 is in communication with communication node 16. In yet another embodiment, location application 51 may reside on communication device 12, 32.

Location application 51 may process information from one or more information sources. One such information source is location database 41. In one embodiment of the present invention, location database 41 stores geographic locations. For example, a user may send a geographic location such as a street address to be stored in location database 41. The user may input the location to be stored from a communication device 12, 32 via communication node 16.

Location database 41 may contain an identifier and associated address information. For example, location database 41 may contain the identifier "Home" and the address "3200 N. Clark Street, Chicago, Ill. 60657" as one entry. The data stored in location database 41 may also take other forms including, but not limited to, latitude/longitude, points of interest or intersections. For example, the address and identifier above may also take the format "Home" and associated intersection "Belmont and Clark, Chicago".

Location application 51 may also process information from one or more information sources such as authentication source 43. In one embodiment of the present invention, authentication source 43 stores authentic ("real") geographic locations. Alternatively, this authentication source 43 authenticates, verifies or otherwise processes information about to be stored or already stored in location database 41. For example, a user may send a geographic location such as a street address to be stored in location database 41. Before it is accepted to be stored, communication system 10 authenticates or otherwise processes the address using authentication source 43. For example, authentication source 43 may be a Geographic Information System (GIS) engine that authenticates the address as an existing address. In one embodiment of the invention, authentication source 43 may authenticate that the address is accurate, e.g. the user desires to store the address of a restaurant in Seattle but the authentication source 43 indicates the address is that of a bank in Seattle and thus the authentication source does not authenticate the address. In another embodiment, authentication source 43 may complete or correct the location input by the user, e.g. the user enters "1411 Opus Place, Downers Grove, Ill." and the authentication source 43 verifies that the address is authentic and unambiguous and completes the address with the zip code or zip+4.

The user may input the location to be stored from a communication device 12, 32 via communication node 16.

In one embodiment, authentication source 43 may comprise authentic ("real") cellular and sector identification information. Authentication source 43 may also include maps relating to such cellular and sector identification information. Authentication source 43 may also include geographical and non-geographical information about countries, states/provinces, counties/parishes, metropolitan areas, cities, ZIP codes, area codes, landmarks, points of interest, subway and train stations, airports, streets, gas stations, Automated Teller Machines (ATMs), hospitals, police stations, restaurants, etc. In one embodiment, authentication source 43 may comprise a virtual map of a given area, complete with a listing of all geographical entities on the map, such as a listing of all streets within Chicago, Ill., for example. Authentication source 43 may also include such information as specific names and addresses (e.g. a list of hospital names and their addresses) or a more general address listing (e.g. an electronic "yellow pages").

Location parameters that may be authenticated by authentication source 43 include, but are not limited to: lists of streets within a city; lists of streets within a cell or sector; lists of streets within a state; lists of street names and numbers; zip code lists; lists of street intersections; lists of landmarks in a given city, state, cell or sector; lists of places of interests in a given city, state, cell or sector; lists of banks in a given city, state, cell or sector; lists of restaurants in a given city, state, cell or sector; lists of hotels in a given city, state, cell or sector; lists of post offices in a given city, state, cell or sector; lists of businesses of a given type in a given city, state, cell or sector, etc.

In one embodiment of the invention, communication system 10 also includes an authentication application 53. Authentication application 53 may process information to be authenticated by authentication source 43 or information about to be stored or already stored. Authentication application 53 may be in communication with location application 51, communication node 16, authentication source 43 and/or location database 41, either residing in one or more of these nodes or residing separately from one or more of these nodes. In one embodiment authentication application 53 may be a Geographic Information System (GIS) engine that authenticates the addresses.

Authentication application 53 may include one or more programs or other applications for processing location information. Authentication application 53 may comprise computer readable/processable program code. Such location information may be information input by user 20, 30 via device 12, 32. Alternatively, location information processed by authentication application 53 may be information provided by communication node 16 or forwarded by communication node 16 from communication networks 14, 18. Location information processed by authentication application 53 may also be provided by information sources such as location database 41 or authentication source 43.

The communication device 12, 32 of the communication system 10 may be utilized by end user 20, 30 to access and/or connect with the communication node 16. Communication device 12, 32 may also be used by end user 20, 30 to access and/or connect with location application 51. The communication device 12, 32 can include, but is not limited to, wireline telephones, mobile telephones, paging units, radio units, wireless data devices, Web telephones, portable or wireless telephones, personal information managers (PIMs), personal digital assistants (PDAs), personal computers (PCs), network televisions (TVs), Internet TVs, Internet telephones, portable wireless devices (i.e., two-way pagers), security systems (both mobile and premises-based), workstations or any other suitable communication devices.

Regardless of its specific form, the communication devices 12, 32 have user-input interfaces 24, 28 and/or user-output interfaces 34, 38. Alternatively, the user-input interfaces 24, 28 and/or user-output interfaces 34, 38 may work in conjunction with the communication device 12, 32 without actually residing on the device 12, 32.

The user-input interfaces 24, 28 may receive input from the users 20, 30 and the user-output interfaces 34, 38 may provide output to the users 20, 30. The user-input interfaces 24, 28 can include, but are not limited to, one or more of an electroacoustic transducer, such as, for example, a microphone to receive voice and other audible input from the users 20, 30, a keypad or a keyboard to receive key strokes from the users 20, 30, a touchpad or touchscreen to receive touch input from the users 20, 30, a handwriting recognition interface to receive handwritten input from users 20, 30, and a pointing device such as a mouse or a trackball to receive point and click inputs from the users 20, 30. In one embodiment of the present invention, user-input interface 24, 28 may be a modified car dashboard allowing input from users 20, 30.

The user-output interfaces 34, 38 of the communication devices 12, 32 can include, but are not limited to, one or more of an electroacoustic transducer such as, for example, a speaker to provide voice and other audible output to the users 20, 30, and a visual display device such as a liquid crystal display or a cathode ray tube to provide graphical and/or textual information to the users 20, 30. In one embodiment of the present invention, user-output interface 34, 38 may be a modified car dashboard providing output to users 20, 30.

Each of the communication devices 12, 32 may include more than one user-input interface 24, 28 or more than one user-output interface 34, 38. Moreover, the user may use one or more user-input interfaces 24, 28 or user-output interfaces 34, 38 simultaneously. For example, a wireless telephone may have a microphone, a telephone keypad, a speaker, and a visual display device.

In one embodiment of the invention, an input interface 24, 28 may also reside on the communication node 16. Output interface 34, 38 may also reside on the communication node 16. Alternatively, input interface 24, 28 may reside on the communication node 16 while output interface 34, 38 resides on the device 12, 32. Alternatively, input interface 24, 28 may reside on the device 12, 32 while output interface 34, 38 resides on communication node 16.

The communication device 12, 32 may also communicate with communication networks 14, 18 via the communication node 16. The communication network 14 can interface with the communication device 12, 32 through wireline or wireless networks or systems (i.e., telephone or televisions systems, Integrated Services Digital Network (ISDN) systems, coaxial lines, computer networks, digital end user lines, private networks, wireless local loop systems, etc.).

The communication networks 14, 18 of the communication system 10 can include, but are not limited to, intranets, extranets, the Internet, a Local Area Network (LAN), a telephone network, (e.g., a Public Switched Telephone Network (PSTN), private telephone networks, etc.), a cellular network, satellite networks, a personal communication system, a TV network (e.g., a cable TV system), local, regional, national or global paging networks, an email system, a wireless data network (e.g., satellite data or local wireless data networks), a wireless LAN, a wireless local loop/distribution system (e.g., LMDS, MMDS or Code Division Multiple Access (CDMA) based system), a Voice Over Internet Protocol (VOIP) network, or any other suitable network. The communication networks 14, 18 can also include a wide area network (WAN), such as, for example, the Internet, the World Wide Web (WWW) or any other similar on-line service. It will be recognized that the communication networks 14, 18 may have portions in common, may comprise two separate networks, or may be the same network.

The communication node 16 of the communication system 10 can include, but is not limited to, an interactive voice response node, a server computer, the MIX™ platform and the Myosphere™ Service provided by Motorola, Inc. of Schaumburg, Ill. (as further described with reference to FIG. 4), or other suitable system. It will be recognized that the communication node 16 may be integrated within or may be remote from the communication networks 14, 18.

Figure 2:
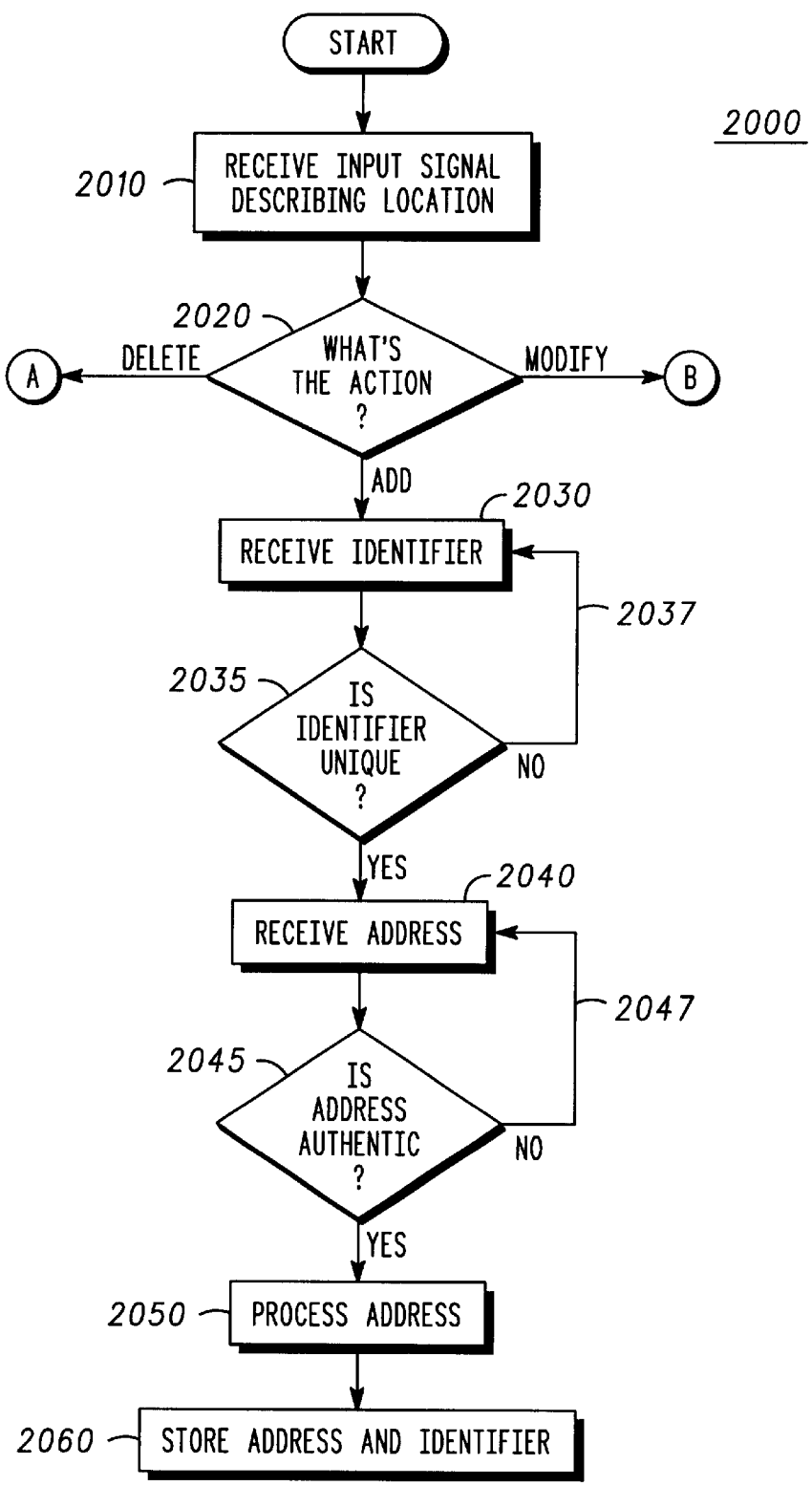
FIG. 2 is a flow diagram illustrating a routine for storing an authentic location.

FIG. 2 illustrates one embodiment of a routine for storing, modifying or deleting a location in accordance with the present invention at 2000. It should be understood that the order of many of the steps as presented in FIG. 2 could be changed without affecting the functioning of system 10 or the outcome of the routine.

The routine of FIG. 2 may be used, for example, when a user 20, 30 first wishes to store a location in accordance with the present invention. The location may be stored in location database 41. In one embodiment of the invention, the device 12, 32 may be used to store the location for the first time and active input from use 20, 30 may be required. Storing, modifying and deleting locations may be done directly by a user, by an assistant, by the service provider, by another authorized entity or through synchronization with other databases.

At Block 2010, an input signal is received which describes the location. Such an input signal may include a location, an address, an identifier identifying the location and an action to be taken such as add, modify, delete, etc. or any combination thereof (e.g. a location and an address, a location and an identifier, etc.) The signal may take the form of a request for information or a URL (Uniform Resource Locator) request. This signal may also be data describing the location to be entered into location database 41. For example, the input signal may be a street address or a street address and an identifier.

The end user 20, 30 may transmit this signal through a communication device 12, 32. Alternatively, device 12, 32 may include a browser such as a web browser, and the signal may be transmitted by the browser.

The signal may then be received at Block 2010. The node 16 may receive the signal directly or the node may intercept the signal (for example, the node may intercept a signal which is a URL request being sent for communication network 14, 18). The input signal may be transmitted to the communication node 16 which may then forward the signal to location database 41 or location application 51. Alternatively, the input signal may be received directly by location database 41 or location application 51.

At Block 2020, the action to be taken determines which routine may be used in accordance with the present invention. For example, FIG. 2 shows three possible actions: delete, add and modify. These three actions serve as examples and do not limit the actions that may be taken in accordance with the present invention.

In the case of adding a location to be stored, at block 2030 an identifier may be received. This identifier may be included in the initial input signal transmitted at Block 2010. Alternatively, the identifier may be sent separately.

At Block 2035 the uniqueness of the identifier is evaluated. In one embodiment, this evaluation is performed by geographical location application 51. Alternatively, this evaluation is performed by node 16. Alternatively, geographical location application 51 on node 16 may perform this evaluation. In one embodiment this evaluation includes a determination by location application 51 of whether or not the location identifier is already in use. Generally, it is envisioned that the geographical location application 51 will determine whether the address is unique for an individual user 20, 30. Alternatively, the geographical location application 51 may determine if this identifier is a commonly used identifier. For example, the location identifier may be "Sears Tower." In the case "Sears Tower," the location identifier may be one that is common to all devices of a given type or all users/subscribers within a given system. For example, all Motorola devices use "Sears Tower" as the location identifier for the address designating the Sears Tower. If the location identifier is already in use (as seen at 2037) another identifier must be received as illustrated at 2030. If the location identifier is already in use, a signal may be forwarded from the communication node 16 to user 20, 30. This signal may be, for example, a message indicating that the location identifier is already used and a new location identifier must be chosen.

In one embodiment, the user is prompted to confirm the identifier received at Block 2030. In another embodiment the identifier may be provided to the user via user output interface 38 and then confirmed. Alternatively, the identifier may be automatically generated by location application 51, by communication node 16 or another party, such as a system administrator. The identifier may be stored temporarily in any suitable manner, such as, for example, in a memory database in communication with communication node 16 or device 12, 32.

If the location identifier received at Block 2030 is not currently in use or is otherwise determined to be unique, the address associated with the location identifier may be received at Block 2040. In one embodiment the node 16 may forward the address from location application 51 so that it is received at authentication application 53.

Authentication application 53 may then evaluate whether the address is authentic at block 2045. Alternatively, the address may be evaluated by node 16, or by geographic authentic application 53 on node 16. An authentic address may be, for example, an address that is determined to exist in the real world and that can be geo-coded unambiguously. For example, an authentic address may be one for which only a single contiguous area exists. Such an address may be, for example, an address that is listed in a database comprising authentic ("real") addresses. The address may be authenticated by any appropriate authentic source, for example, authentication source 43. At Block 2045, authentication application 53 may return an authentication response. Node 16 may forward the authentication response from the authentication application 53 to location application 51. Alternatively, the geographic authentication 53 may send its authentication response directly to location application 51. Once geographic authentication response is received by location application 51, the response will indicate if the location is authenticated. If as seen at 2047 the location is not authenticated, then the routine returns to 2040 and the location is not stored in location database 41.

If the location is authenticated, the location may be processed (e.g. converted to an appropriate format such as a latitude and longitude) at block 2050. Such processing may include translating the identifier and its associated address to a latitude/longitude figure, encrypting the identifier and associated address or any other suitable processing. Such processing may also include completing the associated address, e.g. adding a zip code or a zip+4 to the address.

Then at block 2060, the identifier and its associated location may be stored, for example, in location database 41.

Alternatively, if the location has not been authenticated, location application 51 may generate a response communicated via user output interface 34, 38 such as a "Location has been rejected" message indicating to the user that location database 41 will not store the location. In one embodiment, if the location is not authenticated, the communication node 16 or location application 51 may abort the session.

Alternatively, as seen at 2047, a new address may be received. If the address is not authenticated, the communication node 16 may forward a signal from the authentication application 53 to the device 12, 32 and/or user 20, 30. Location application 51 may also send such messages as "More information?" prompts or other prompts asking the user to re-enter the address. Thus, in one embodiment of the invention, if the address is not authenticated the routine returns to 2040 as shown at 2047.

It should be noted that the steps illustrated at blocks 2030, 2035, 2040 and 2045 may occur in the sequence illustrated, simultaneously or in any other suitable sequence.

During the time the address and identifier are being authenticated and evaluated, a signal may be sent to the user, for example via the browser of device 12, 32. This signal may contain one or more commands to the browser of device 12, 32. In one embodiment of the invention, the response may be sent via node 16. Alternatively, the signal may be sent directly from location application 51 or authentication application 53. In one embodiment of the invention, the browser of device 12, 32 may display a "Location being authenticated" message during this time period.

At Block 2060, the authenticated address and its associated unique identifier may be stored. These may be stored at node 16, or on device 12, 32, in location database 41 or in any other appropriate place. The address and identifier may be stored by location application 51 or by authentication application 53. The address and identifier may be stored separately or in the same place.

Once the identifier and associated address have been stored the application may send a response to the user 20, 30. This response may contain one or more commands. For example, the message "Location has been authenticated" may be displayed during this time. Additional commands may include a "Store location?" prompt or prompts asking additional information from the user.

Figure 3:
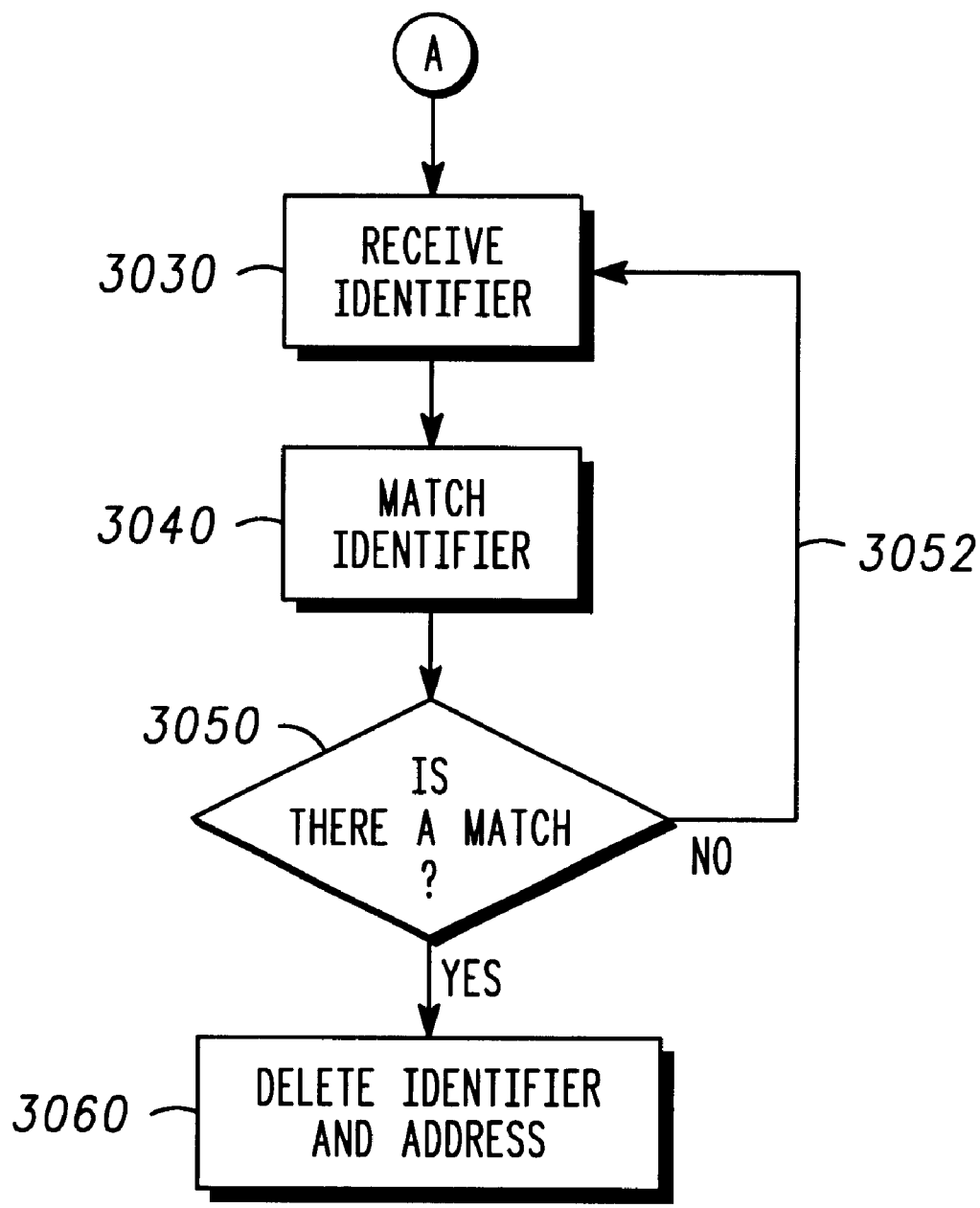
FIG. 3 is a flow diagram illustrating a routine for deleting a stored location.

FIG. 3 illustrates one embodiment of a routine for deleting location-relevant information in accordance with the present invention at 3000. It should be understood that the order of many of the steps as presented in FIG. 3 could be changed without affecting the functioning of system 10 or the outcome of the routine. The routine of FIG. 3 may begin with the input signal being received as illustrated at Block 2010 of FIG. 2.

At Block 3030 of FIG. 3, the identifier may be received. The identifier may be, for example, a suitable location identifier as described above.

Then, at Block 3040 the received identifier may be matched with an identifier that has already been stored. Such an identifier may have been stored, for example, as indicated at Block 2060 of FIG. 2. At 3050, it is evaluated whether the identifier entered at block 3030 matches any of the stored identifiers. If there is a match, the identifier and its associated address may be deleted at block 3060. Alternatively, if there is not a match the routine may return to 3030 as indicated by the loop shown at 3052. Another identifier may then be received.

Figure 4:
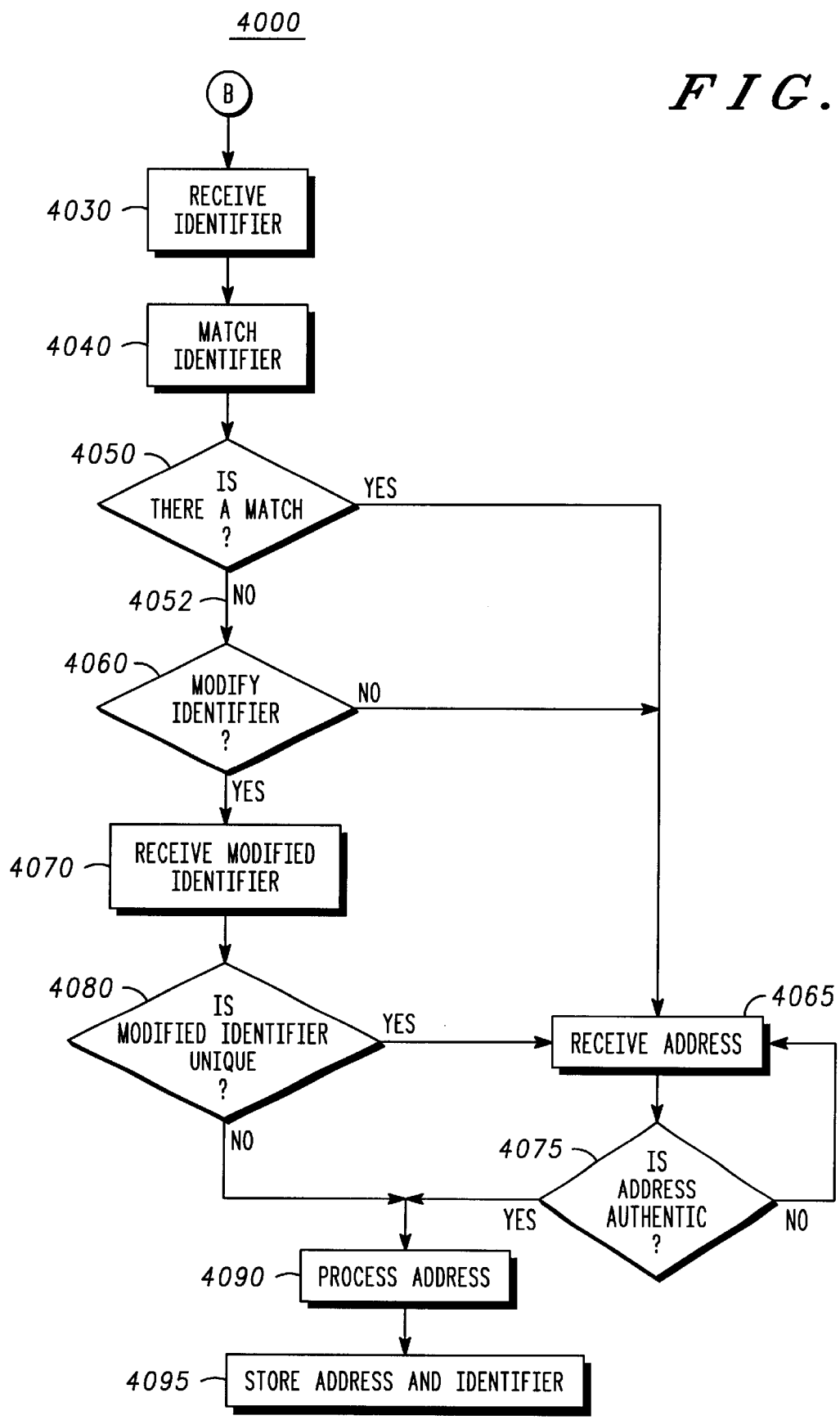
FIG. 4 is a flow diagram illustrating a routine for modifying a stored location.

FIG. 4 illustrates one embodiment of a routine for modifying the stored location-relevant information in accordance with the present invention at 4000. It should be understood that the order of many of the steps as presented in FIG. 4 could be changed without affecting the functioning of system 10 or the outcome of the routine.

The routine of FIG. 4 may begin with the input signal being received as illustrated at Block 2010 of FIG. 2.

At Block 4030 of FIG. 4, the identifier may be received. The identifier may be, for example, a suitable location identifier as described above.

Then, at Block 4040 the received identifier may be matched with the list of identifiers that have already been stored, for example, as indicated at Block 2060 of FIG. 2. At 4050, it is evaluated whether the identifier entered at block 4030 matches any of the stored identifiers.

If there is a match, the identifier may then be modified at block 4060. The modified identifier is then received at block 4070 and the uniqueness of the modified identifier is verified at block 4080. Once the modified identifier is verified as unique, a new address to associate with the identifier may optionally be received at block 4065. Alternatively, the address to associate with the modified identifier may remain the same as the address associated with the original identifier. The address is then authenticated at block 4075. If the address is determined to be authentic, it may be processed at block 4090 as described above. The modified identifier and associated address are then stored at block 4095.

Alternatively, if the received identifier matches a stored identifier at block 4050, the matched identifier may not be modified. In this case, the address to be associated with the matched identifier is received at block 4065. The address is then authenticated at block 4075. If the address is determined to be authentic, it may be processed at block 4090 as described above. The identifier and associated address are then stored at block 4095.

Figure 5:
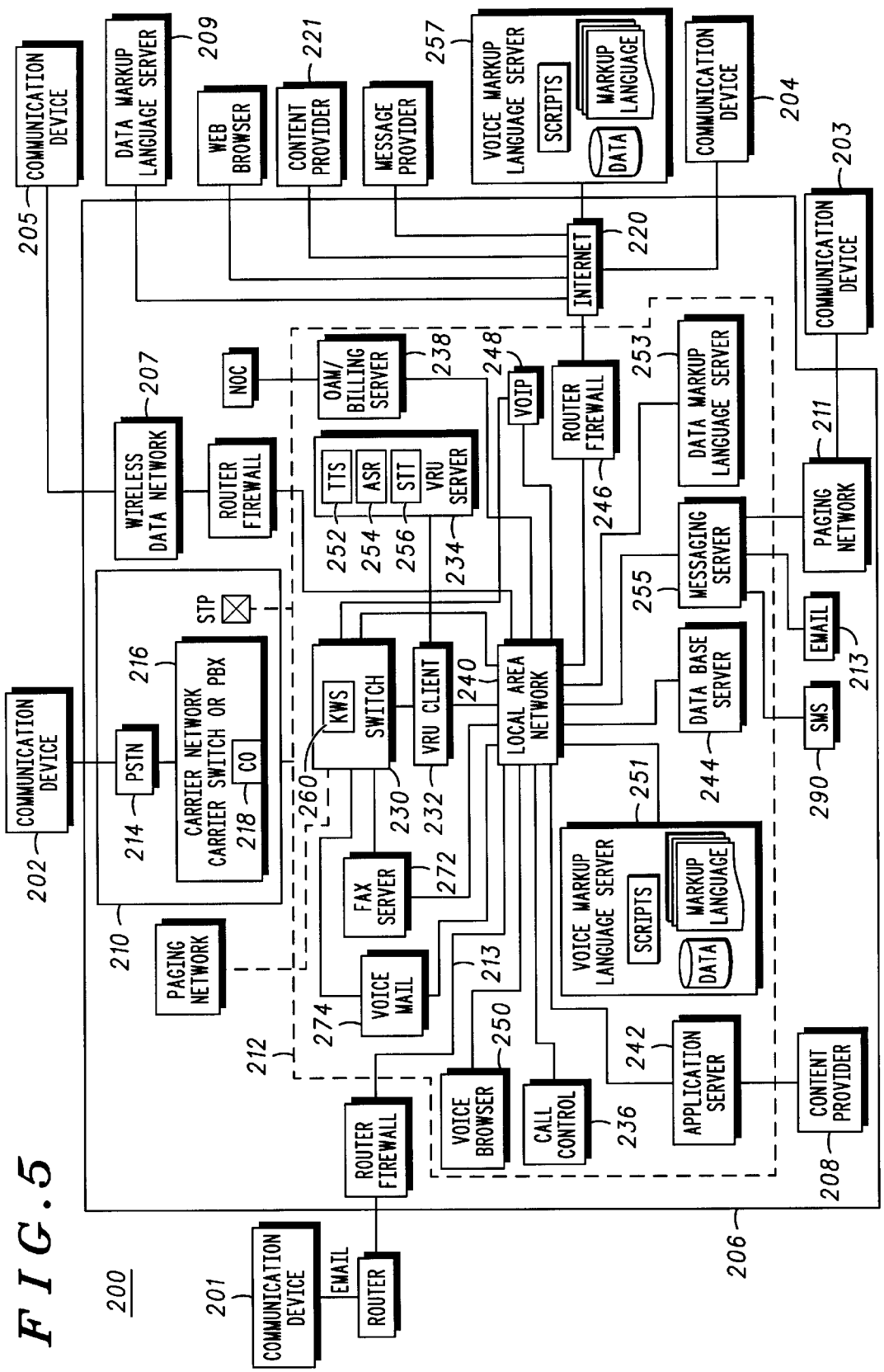
FIG. 5 is an exemplary block diagram of an alternate communication system in which the methods of FIGS. 2–4 can be implemented.

Referring now to FIG. 5, an exemplary block diagram of another embodiment of a communication system 200 having the capability to store locations and access stored locations is illustrated.

The communication system 200 generally includes one or more communication devices 201, 202, 203, 204, 205 (five being shown), an electronic network 206, and one or more information sources (e.g., content providers 208, 221 (two being shown) and data and voice markup language servers 209, 251, 253, 257).

The user can access the electronic network 206 by dialing a single direct access telephone number (e.g., a foreign telephone number, a local telephone number, or a toll-free telephone number or PBX) from the communication device 201. The user can also access the electronic network 206 from the communication device 202 via the Internet 220 or world wide web (WWW), from the communication device 203 via a paging network 211, or from the communication device 205 via a local area network (LAN), a wide area network (WAN), an e-mail connection or in any other similar manner.

As shown in FIG. 5, the electronic network 206 includes a telecommunication network 210 and a communication node 212. The telecommunication network 210 is preferably connected to the communication node 212 via a high-speed data link, such as, for example, a T1 telephone line, a LAN, a WAN or a voice over internet protocol (VOIP) network. The telecommunication network 210 preferably includes a PSTN 214 and a carrier network 216. The telecommunication network 210 can also include, for example, international or local exchange networks, cable TV networks, interexchange carrier or long distance carrier networks, cellular networks (e.g., mobile switching centers), private branch exchange (PBXs, satellite systems, wireless data networks and other switching centers such as conventional or trunked radio systems (not shown), etc. The electronic network 206 can also include additional telecommunication networks, such as, for example, a wireless data network 207.

The PSTN 214 can include various types of communication equipment, such as, for example, ATM networks, Fiber Distributed Data networks (FDDI), T1 lines, cable TV networks, VOIP networks and the like. The carrier network 216 generally includes a telephone switching system or central office 218.

It will be recognized that the carrier network 216 can be any suitable system that can route calls to the communication node 212, and the central office 218 can be any suitable wire-line or wireless switching system.

The communication node 212 is preferably configured to receive and process incoming calls from the carrier network 216 and the Internet 220. The communication node 212 can receive and process pages from the paging network 211 and can also receive and process messages (e.g., e-mails) from the LAN, WAN, wireless data or e-mail system 213.

When a user dials into the electronic network 206 from the communication device 201, the carrier network 216 routes the incoming call from the PSTN 214 to the communication node 212 over one or more telephone lines or trunks. The incoming calls preferably enter the carrier network 216 through one or more "888" or "800" Inward Wide Area Telecommunications Services trunk lines, local exchange or long distance trunk lines. It is also contemplated that the incoming calls can be received from a cable, cellular or VOIP network or any other suitable system.

The communication node 212 answers the incoming call from the carrier network 216 and retrieves an appropriate announcement (e.g., a welcome greeting) from a database, server or browser. The communication node 212 then plays the announcement to the caller. In response to audio inputs from the user, the communication node 212 retrieves information from a destination or database of one or more of the information sources, such as the content providers 208, 221 or the markup language servers 209, 251, 253, 257. After the communication node 212 receives the information, it provides a response to the user based upon the retrieved information.

The communication node 212 can provide various dialog voice personalities (e.g., a female voice, a male voice, and of any desirable voice characteristic or accent), and can implement various grammars (e.g., vocabulary) to detect and respond to the audio inputs from the user. In addition, the communication node 212 can automatically select various speech recognition models (e.g., English or Spanish, or an accent such as an American accent model) based upon a user's profile, communication device and/or speech patterns. The communication node 212 can also allow the user to select a particular speech recognition model.

When a user accesses the electronic network 206 from a communication device 201, 202, 203, 204, 205 registered with the system (e.g., home telephone, work telephone, cellular telephone, etc.), the communication node 212 can by-pass a user screening option and automatically identify the user (or the type of communication device) through the use of ANI or CLI. After the communication node 212 verifies the call, the communication node 212 provides a greeting (e.g., "Hi, this is your personal agent, Mya. Welcome Bob. How may I help you?"). The communication node 212 then enters into a dialogue with the user, and the user can select a variety of services offered by the communication node 212.

When the user accesses the electronic network 206 from a communication device not registered with the system (e.g., a payphone, a telephone of a non-user, etc.), the communication node 212 answers the call and prompts the user to enter his or her name and/or a personal identification number (PIN) using voice commands or DTMF signals. The communication node 212 can also utilize speaker verification to identify the particular speech pattern of the user. If the communication node 212 authorizes the user to access the system, the communication node 212 provides a personal greeting to the user (e.g., "Hi, this is your personal agent, Mya. Welcome Ann. How may I help you?"). The communication node 212 then enters into a dialogue with the user, and the user can select various services offered by the communication node 212. If the name and/or PIN of the user cannot be recognized or verified by the communication node 212, the user will be routed to a customer service representative.

Once the user has accessed the communication system 200, the user may implement a wide variety of services and features by using voice commands, such as, for example, voice dialing, voice paging, facsimiles, caller announcements, voice mails, reminders, call forwarding, call recording, content information (e.g., newspapers, etc.), read e-mail, read calendars, read "to-do" lists, banking, e-commerce. The communication system 200 can place outbound calls and pages to business and personal parties or contacts (e.g., friends, clients, business associates, family members, etc.) in response to DTMF signals or voice commands. The calls can be routed through a telephone or electronic network to the selected party and the pagers can be sent to a selected party via a paging system. The communication system 200 can also receive calls routed through a telephone or electronic network.

As shown in FIG. 5, the communication node 212 preferably includes a telephone switch 230, a voice or audio recognition (VRU) client 232, a VRU server 234, a controller or call control unit 236, an Operation and Maintenance Office or a billing server unit 238, a LAN 240, an application server unit 242, a database server unit 244, a gateway server or router firewall server unit 246, a VOIP unit 248, a voice browser 250, a voice markup language server 251, a messaging server 255 and a data markup language server 253. Although the communication node 212 is shown as being constructed with various types of independent and separate units or devices, the communication node 212 can be implemented by one or more integrated circuits, microprocessors, microcontrollers or computers which may be programmed to execute the operations or functions equivalent to those performed by the devices or units shown. It will also be recognized that the communication node 212 can be carried out in the form of hardware components and circuit designs and/or software or computer programs.

The communication node 212 can be located in various geographic locations throughout the world or the United States (e.g., Chicago, Ill.). The communication node 212 can be operated by one or more carriers (e.g., Sprint, Qwest, MCI, etc.) or independent service providers (e.g., Motorola, Inc.).

The communication node 212 can be integrated with the carrier network 216 or can be located remote from the carrier network 216. It is also contemplated that the communication node 212 may be integrated into a communication device, such as, for example, a wire-line or wireless telephone, a radio device, a personal computer (PC), a personal digital assistant (PDA), a personal information management (PIM) or the like, and can be programmed to connect or link directly to an information source.

The communication node 212 can also be configured as a standalone system to allow users to dial directly into the communication node 212 via a direct access telephone number. In addition, the communication node 212 may comprise a telephony switch (e.g., a PBX or Centrix unit), an enterprise network or a LAN. In this configuration, the communication system 200 can be implemented to automatically connect a user to the communication node 212 when the user accesses a communication device.

When the telephone switch 230 receives an incoming call from the carrier network 216, the call control unit 236 sets up a connection in the telephone switch 230 to the VRU client 232. The communication node 212 then enters into a dialog with the user regarding various services and functions. The VRU client 232 preferably generates pre-recorded voice announcements and/or messages to prompt the user to provide inputs to the communication node 212 using voice commands or DTMF signals. In response to the inputs from the user, the communication node 212 retrieves information from a destination of one of the information sources and provides outputs to the user.

The telephone switch 230 is preferably connected to the VRU client 232, the VOIP unit 248 and the LAN 240. The telephone switch 230 receives incoming calls from the carrier network 216. The telephone switch 230 also receives incoming calls from the communication device 202 routed over the Internet 220 via the VOIP unit 248. The telephone switch 230 also receives messages and pages from communication devices 203, 205, respectively. The telephone switch 230 is preferably a digital cross-connect switch, Model LNX, available from Excel Switching Corporation, Hyannis, Mass. It will be recognized that the telephone switch 230 can be any suitable switch.

The VRU client 232 is preferably connected to the VRU server 234 and the LAN 240. The VRU client 232 processes voice communications, DTMF signals, pages and messages (e.g., e-mails). Upon receiving voice communications, the VRU client 232 routes the speech communications to the VRU server 234. When the VRU client 232 detects DTMF signals, it sends a command to the call control unit 236. It will be recognized that the VRU client 232 can be integrated with the VRU server 234.

The VRU client 232 preferably comprises a PC, such as, for example, a Windows NT compatible PC, with hardware capable of connecting individual telephone lines directly to the telephone switch 230 or carrier network 216. The VRU client 232 preferably includes a microprocessor, random access memory, read-only memory, a T1 or ISDN interface board, and one or more voice communication processing boards (not shown). The voice communication processing boards are preferably Dialogic boards, Antares Model, available from Dialogic Corporation, Parsippany, N.J. The voice communication boards may include a voice recognition engine having a vocabulary for detecting a speech pattern. The voice recognition engine is preferably a RecServer software package, available from Nuance Communications, Menlo Park, Calif.

The VRU client 232 can also include an echo canceller (not shown) to reduce or cancel TTS or playback echoes transmitted from the PSTN 214 due to hybrid impedance mismatches. The echo canceller is preferably included in an Antares Board Support Package, also available from Dialogic.

The call control unit 236 is preferably connected to the LAN 240, and sets up the telephone switch 230 to connect incoming calls to the VRU client 232. The call control unit 236 also sets up incoming calls or pages to the communication node 212 over the Internet 220 and pages and messages sent from the communication devices 203, 205 via the paging network 211 and e-mail system 213, respectively. The control call unit 236 preferably comprises a PC, such as, for example, a Windows NT compatible PC.

The LAN 240 allows the various components and devices of the communication node 212 to communicate with each other via twisted pair, fiber optic, coaxial cables or the like. The LAN 240 may use Ethernet, Token Ring or other suitable types of protocols. The LAN 240 is preferably a 100 Megabit per second Ethernet switch, available from Cisco Systems, San Jose, Calif., and can comprise any suitable network system. The communication node 212 may include a plurality of LANs.

The VRU server 234 is connected to the VRU client 232 and the LAN 240. The VRU server 234 receives voice communications from the user via the VRU client 232. The VRU server 234 processes the voice communications and compares the voice communications against a vocabulary or grammar stored in the database server unit 244 or a similar memory device. The VRU server 234 provides output signals, representing the result of the voice communications processing, to the LAN 240. The LAN 240 routes the output signal to the call control unit 236, the application server unit 242 and/or the voice browser 250. The communication node 212 then performs a specific function associated with the output signals.

The VRU server 234 preferably includes a TTS unit 252, an automatic speech recognition (ASR) unit 254, and a STT unit 256. The TTS unit 252 receives textual data or information (e.g., e-mail, web pages, documents, files, etc.) from the application server unit 242, the database server unit 244, the call control unit 236, the gateway server unit 246, the application server unit 242 and the voice browser 250. The TTS unit 252 processes the textual data and converts the data to voice data or information.

The TTS unit 252 can provide data to the VRU client 232, which reads or plays the data to the user. For example, when the user requests information (e.g., news updates, stock information, traffic conditions, etc.), the communication node 212 retrieves the desired data (e.g., textual information) from a destination of the one or more of the information sources and converts the data via the TTS unit 252 into a response.

The response is then sent to the VRU client 232. The VRU client 232 processes the response and reads an audio message to the user based upon the response. It is contemplated that the VRU server 234 can read the audio message to the user using human recorded speech or synthesized speech. The TTS unit 252 is preferably a TTS 2000 software package, available from Lernout and Hauspie Speech Product NV, Burlington, Mass.

The ASR unit 254 provides speaker dependent or independent automatic voice recognition of voice communications from the user. It is contemplated that the ASR unit 254 can include speaker dependent voice recognition. The ASR unit 254 processes the voice communications to determine whether a word or a speech pattern matches any of the grammars or vocabulary stored in the database server unit 244 or downloaded from the voice browser 250. When the ASR unit 254 identifies a selected speech pattern of the voice communications, the ASR unit 254 sends an output signal to implement the specific function associated with the recognized speech pattern. The ASR unit 254 is preferably a speaker independent voice recognition software package, RecServer Model, also available from Nuance Communications. It is contemplated that the ASR unit 254 can be any suitable voice recognition unit to detect voice communications.

The STT unit 256 receives voice communications and converts the voice communications to textual information (e.g., a text message). The textual information can be sent or routed to the communication devices 201, 202, 203, 204, 205, the content providers 208, 221, the markup language servers 209, 251, 253, 257, the voice browser 250 and the application server unit 242. The STT unit 256 is preferably a Naturally Speaking software package, available from Dragon Systems, Newton, Mass.

The VOIP unit 248 is preferably connected to the telephone switch 230 and the LAN 240. The VOIP unit 248 allows a user to access the communication node 212 via the Internet 220 or VOIP public network using voice commands. The VOIP unit 248 can receive VOIP protocols (e.g., H.323 protocols) transmitted over the Internet 220 or Intranet, and can convert the VOIP protocols to voice information or data. The voice information can then be read to the user via the VRU client 232. The VOIP unit 248 can also receive voice communications from the user and convert the voice communications to a VOIP protocol that can be transmitted over the Internet 220. The VOIP unit 248 is preferably a Voice Net software package, also available from Dialogic Corporation. It will be recognized that the VOIP unit 248 can be incorporated into a communication device.

The communication node 212 also includes a detection unit 260. The detection unit 260 is preferably a phrase or key word spotter unit, detecting incoming audio inputs or communications or DTMF signals from the user. The detection unit 260 is preferably incorporated into the telephone switch 230, but can be incorporated into the VRU client 232, the carrier network 216 or the VRU server 234. The detection unit 260 is preferably included in a RecServer software package, also available from Nuance Communications.

The detection unit 260 records the audio inputs from the user and compares the audio inputs to the vocabulary or grammar stored in the database server unit 244. The detection unit 260 continuously monitors the user's audio inputs for a key phase or word after the user is connected to the node 212. When the detection unit 260 detects the key phrase or word, the VRU client 232 plays a pre-recorded message to the user. The VRU client 232 then responds to the audio inputs provided by the user.

The billing server unit 238 is preferably connected to the LAN 240. The billing server unit 238 can record data about the use of the communication node 212 by a user (e.g., length of calls, features accessed by the user, etc.). Upon completion of a call by a user, the call control unit 236 sends data to the billing server unit 238. The billing server unit 238 can subsequently process the data in order to prepare customer bills. The billing server unit 238 can use the ANI or CLI of the communication device to properly bill the user. The billing server unit 238 preferably comprises a Windows NT compatible PC.

The gateway server unit 246 is preferably connected to the LAN 240 and the Internet 220. The gateway server unit 246 provides access to the content provider 221 and the voice markup language server 257 via the Internet 220. The gateway server unit 246 allows users to access the communication node 212 from the communication device 202 via the Internet 220. The gateway server unit 246 can function as a firewall to control access to the communication node 212 to authorized users. The gateway server unit 246 is preferably a Cisco Router, also available from Cisco Systems.

The database server unit 244 is preferably connected to the LAN 240. The database server unit 244 preferably includes a plurality of storage areas to store data relating to users, such as, for example, speech vocabularies, dialogs, personalities, user entered data, and other information. Preferably, the database server unit 244 stores a personal file or address book. The personal address book can contain information required for the operation of the communication system 200, including user reference numbers, personal access codes, personal account information, contact's addresses, telephone numbers, etc. The database server unit 244 is preferably a PC, such as, for example, a Windows NT compatible PC.

The application server unit 242 is preferably connected to the LAN 240 and the content provider 208. The application server unit 242 allows the communication node 212 to access information from a destination of the information sources, such as the content providers 208, 221 and the markup language servers 209, 251, 253, 257. For example, the application server unit 242 can retrieve information (e.g., weather reports, stock information, traffic reports, restaurants, flower shops, banks, calendars, "to-do" lists, e-commerce, etc.) from a destination of the information sources. This application server unit 242 may include Starfish Software to provide the address book, calendar and to-do lists, and to allow the user to organize information. The application server unit 242 processes the retrieved information and provides the information to the VRU server 234 and the voice browser 250. The VRU server 234 can provide an audio announcement to the user based upon the information using TTS synthesizing or human recorded voice. The application server unit 242 can also send tasks or requests (e.g., transactional information) received from the user to the information sources (e.g., a request to place an order for a pizza). The application server unit 242 can further receive user inputs from the VRU server 234 based upon a speech recognition output. The application server unit 242 is preferably a PC.

The voice markup language server 251 is preferably connected to the LAN 240. The voice markup language server 251 can include a database, scripts and markup language documents or pages. The voice markup language server 251 is preferably a PC, such as, for example, a Windows NT compatible PC. It will also be recognized that the voice markup language server 251 can be an Internet server (e.g., a Sun Microsystems server).

The messaging server 255 is preferably connected to the LAN 240, the paging network 211, an e-mail system 213 and a short message system (SMS) 290. The messaging server 255 routes pages between the LAN 240 and the paging network 211. The messaging server 255 is preferably a PC, such as, for example, a Windows NT compatible PC. The messaging server 255 can also provide direct storage. It is contemplated that the messaging server 255 can reside externally from the communication node 212.

The voice browser 250 is preferably connected to the LAN 240. The voice browser 250 preferably receives information from the markup language servers 209, 251, 253, 257, the database server unit 244 and the content providers 208, 221. In response to voice commands or DTMF signals, the voice browser 250 generates a content request (e.g., an electronic address) to navigate to a destination of one or more of the information sources. The content request can use at least a portion of a Uniform Resource Locator, an Internet Protocol, a page request, or e-mail.

After the voice browser 250 is connected to an information source, the voice browser 250 preferably uses a Transmission Control Protocol/Internet Protocol connection to pass requests to the information source. The information source responds to the requests, sending at least a portion of the requested information, represented in electronic form, to the voice browser 250. The information can be stored in a database, and can include text content, markup language document or pages, non-text content, dialogs, audio sample data, recognition grammars, etc. The voice browser 250 then parses and interprets the information, further described below. The voice browser 250 can be integrated into the communication devices 201, 202, 203, 204, 205.

As shown in FIG. 5, the content provider 208 is connected to the application server unit 242 of the communication node 212, and the content provider 221 is connected to the gateway server unit 246 of the communication node 212 via the Internet 220. The content providers 208, 221 can store various content information, such as news, banking, commerce, weather, traffic conditions, etc. The content providers 208, 221 can include a server to operate WWW pages or documents in the form of a markup language. The content providers 208, 221 can also include a database, scripts and/or markup language documents or pages. The scripts can include images, audio, grammars, computer programs, etc. The content providers 208, 221 execute suitable server software to send requested information to the voice browser 250.

The voice mail unit 274 is preferably connected to the telephone switch 203 and the LAN 240. The voice mail unit 274 can store voice mail messages from parties trying to send messages to the communication node 212. When a user accesses the electronic network 206, the voice mail unit 274 can notify the user of new and stored messages. The user can access the messages to play, delete, store and forward the messages. When the user accesses a message, the message can be read to the user or can be displayed as textual information on a communication device (e.g., a pager, a SMS 290, or a PDA, etc.). The user can also access and operate external messages or mail systems remote from the electronic network 206.

The FAX server unit 272 is preferably connected to the telephone switch 230 and the LAN 240. The FAX server unit 272 receives and stores facsimile information sent via the electronic network 206 or the carrier network 216. Users can access the facsimile information to play, store, delete, and forward the information. The facsimile information can be read via the TTS unit 252 or can be displayed as textual information on a suitable communication device. The FAX server unit 272 preferably comprises a PC, such as, for example, a Windows NT compatible PC or a Dialogue Fax Server.

Further information regarding communication system 200 is disclosed in U.S. patent application Ser. No. 09/141,485, entitled Telecommunication System and Methods Therefor, filed Aug. 27, 1998, the entire disclosure of which is incorporated herein.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A method for storing geographic information at a communication node, comprising:

receiving geographic data;

transmitting an authentication request to a geographic authentication database in communication with the communication node;

receiving an authentication response regarding the geographic data; and in response to receiving the authentication response, storing the geographic data in a storage database in communication with the communication node.

2. The method of claim 1 wherein the geographic data is selected from the group consisting of:

a latitude and longitude measurement, a cell and sector identification, an address, an intersection, a combined city/state/country identification, a street name combined with a street number, a highway exit number, a highway road marker number, a landmark, and a point of interest.

3. The method of claim 1 wherein the authentication request includes the geographic data.

4. The method of claim 1 wherein the authentication response confirms that the geographic data corresponds to an actual location.

5. The method of claim 1 wherein when the authentication response confirms that the geographic data does not correspond to an actual location, the method further comprising:

notifying a user in communication with the communication node that the geographic data does not correspond to the actual location.

6. The method of claim 5 further comprising:

aborting communication between the user and the communication node.

7. The method of claim 1 wherein the geographic data is associated with an identifier.

8. The method of claim 7 wherein the authentication request includes the identifier.

9. The method of claim 7 further comprising:

verifying that the identifier is unique.

10. The method of claim 7 wherein the identifier is generated automatically.

11. The method of claim 7 wherein the identifier is generated by a user.

12. The method of claim 7 further comprising:

storing the identifier in the storage database in communication with the communication node.

13. The method of claim 12 further comprising:

receiving, at the communication node, the identifier;

forwarding the identifier to the storage database in communication with the communication node; and retrieving the geographic data from the storage database using the identifier.

14. The method of claim 13 further comprising:

forwarding the geographic data to a user in communication with the communication node.

15. The method of claim 1 further comprising:

processing the geographic data.

16. The method of claim 1 further comprising:

translating the geographic data to a latitude and longitude measurement.

17. The method of claim 1 further comprising:

refining the geographic data based on the authentication response.

18. Computer readable medium storing a program for storing geographic information at a communication node, comprising:

computer readable program code that receives geographic data;

computer readable program code that transmits an authentication request including the geographic data to a geographic authentication database in communication with the communication node;

computer readable program code that generates an authentication response regarding the geographic data; and computer readable program code that, in response to detecting the authentication response, stores the geographic data in a storage database in communication with the communication node.

19. The program of claim 18 further comprising:

computer readable program code that associates an identifier with the geographic data.

20. The program of claim 18 further comprising:

computer readable program code that processes the geographic data based on the authentication response.

* * * * *